United States Patent [19]
Deferme

[11] Patent Number: 5,769,190
[45] Date of Patent: Jun. 23, 1998

[54] CONTINUOUS CONTROLLED RESTRICTION VALVE FOR A SHOCK ABSORBER

[75] Inventor: Stefan Deferme, Heusden Zolder, Belgium

[73] Assignee: Tenneco Automotive Inc., Lake Forest, Ill.

[21] Appl. No.: 587,227

[22] Filed: Jan. 16, 1996

[51] Int. Cl.[6] .................................................. F16F 9/50
[52] U.S. Cl. ................. 188/282.1; 188/288; 188/322.15
[58] Field of Search ..................................... 188/282, 288, 188/317, 322.15

[56] References Cited

U.S. PATENT DOCUMENTS

| | | | |
|---|---|---|---|
| 3,756,357 | 9/1973 | Graff et al. | 188/282 |
| 3,981,380 | 9/1976 | Andre | 188/282 |
| 4,036,319 | 7/1977 | Andre | 188/282 |
| 4,096,928 | 6/1978 | Krafzig et al. | 188/282 |
| 4,121,704 | 10/1978 | Nicholls . | |
| 4,423,800 | 1/1984 | Kobiske et al. | 188/282 X |
| 4,610,332 | 9/1986 | Mourray | 188/282 X |
| 4,826,207 | 5/1989 | Yoshioka et al. . | |
| 4,834,223 | 5/1989 | Kawamura et al. . | |
| 4,854,429 | 8/1989 | Casey . | |
| 5,285,878 | 2/1994 | Scheffel et al. . | |
| 5,372,224 | 12/1994 | Samonil et al. . | |

*Primary Examiner*—Robert J. Oberleitner
*Assistant Examiner*—Pamela J. Lipka
*Attorney, Agent, or Firm*—Harness, Dickey & Pierce, PLC

[57] ABSTRACT

A shock absorber utilizes an array of restrictive rebound fluid flow passages radially formed in a piston assembly. The flow passages are defined by a relatively narrow entrance and a relatively wide exit. A contoured wall form one wall of the passage. The restrictive rebound fluid flow passages restrict the flow-through of rebound fluid. The damping characteristics of the shock absorber are determined by the restriction caused by the general shape of the passages. Because restriction produced by the passages is a function of the contour of the passages and the entrance and exit widths, virtually any damping curve may be achieved by forming a passage having a selected contour.

21 Claims, 6 Drawing Sheets

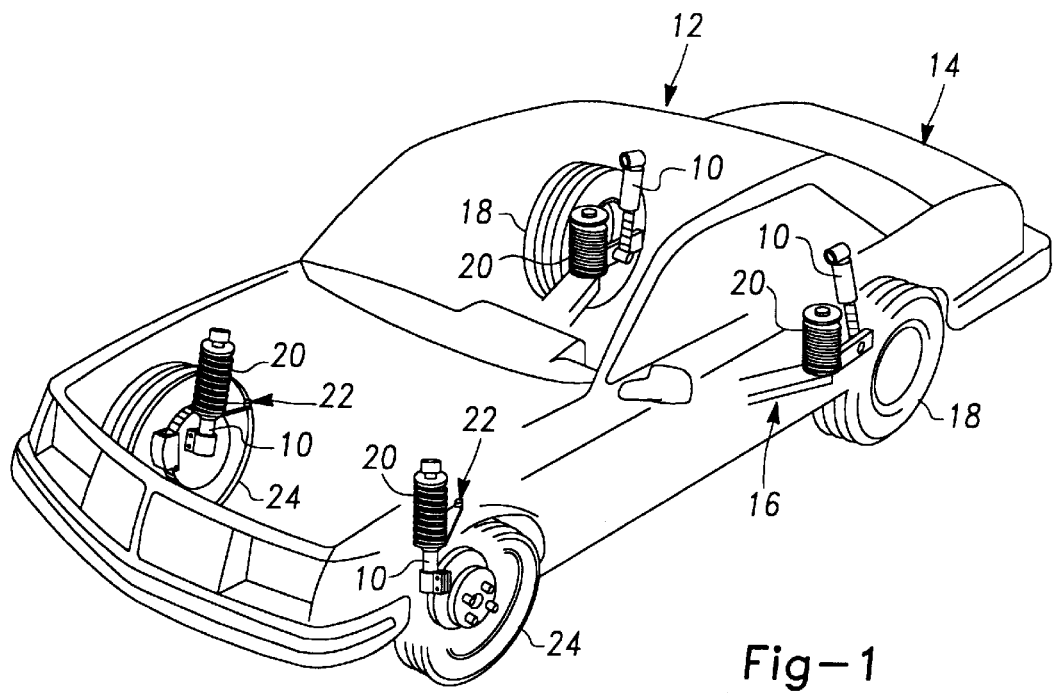
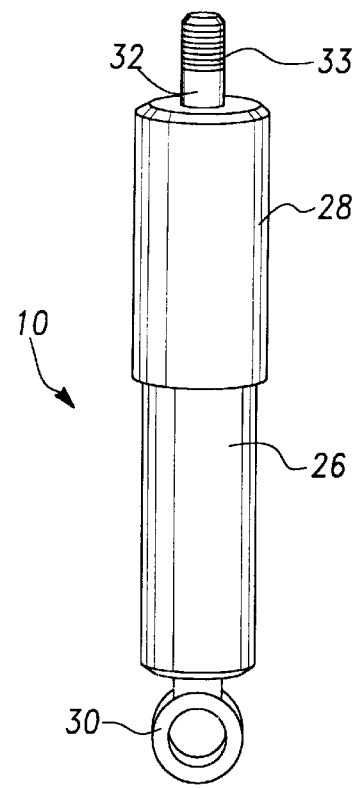
Fig-1
Fig-2

CONTINUOUS CONTROLLED RESTRICTION VALVE FOR A SHOCK ABSORBER

BACKGROUND OF THE INVENTION

1. Field of the Invention

The present invention relates generally to shock absorbers having a specialized rebound piston valve assembly. More particularly, the present invention relates to a shock absorber having a rebound valve assembly defined by a plurality of valve code plates fitted in slots. The restriction of fluid flow is determined as a function of the shape of the valve code plates within a certain over-the-valve pressure range.

2. Description of the Relevant Art

Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile.

The most common type of shock absorber in automobiles is the dashpot type in which a piston is located within the shock absorber and is connected to the vehicle body through a piston rod. Because the piston is available to limit the flow of damping fluid within the working chamber of the shock absorber when the shock absorber is compressed or extended, the shock absorber is able to produce a damping force which counteracts the vibration which would otherwise be transmitted from the suspension of the automobile to the body.

A conventional shock absorber comprises a pressure tube with a piston therein. A piston rod connected to the piston projects from one end of the pressure tube. Damping is controlled by orifices in the piston which regulate passage of fluid from one side of the piston to the other.

Vehicle shock absorbers are generally provided with bleed orifices which allow the restricted flow of damping fluid between the rebound side and the compression side. It is essentially this bleeding that provides the shock absorber with its damping characteristics.

Furthermore, shock absorbers include a blow off valve of some type. These valves are normally in a closed position. However, when pressure within the cylinder achieves a certain predetermined point, the blow off valve opens and alters considerably the restriction of damping fluid flow that would otherwise occur without the presence of the blow off valve.

Conventional shock absorbers utilize relatively complex structures to provide the bleed orifice and the blow off valve. For example, U.S. Pat. No. 4,721,130, issued on Jan. 26, 1988, to Hayashi for VALVE STRUCTURE OF HYDRAULIC BUFFER discloses a valve structure used in a hydraulic buffer. A valve body is used for opening and closing ports in the piston. As the piston rod is extended, a free end of the valve body deflects about a first fulcrum to allow liquid to pass. When the piston is moving at a high speed and the force of liquid passing through the port exceeds the pre-load set to the spring, the spring seat is depressed so that more liquid flows through the port while deflecting the valve body about a second fulcrum.

Additionally, U.S. Pat. No. 2,717,058, issued to Brundrett on Sep. 6, 1955, for SHOCK ABSORBER CONTROL VALVE discloses a shock absorber control valve for controlling restricted flow of hydraulic fluid between opposite ends of a shock absorber cylinder. A valve disk flexes upwardly against a rigid retainer plate as permitted by the angularity of the face portion of the plate. As the requirement for flow further increases, the valve member and the retainer are moved against the compression spring to change the fluid flow rate.

While providing advancements in the art of shock absorber valving, these inventions are relatively complex and fail to produce satisfactory results in terms of efficiency and cost. Accordingly, a shock absorber that combines the flexing disc function of a rebound valve with the blow off function is wanting.

SUMMARY OF THE INVENTION

Accordingly, it is a primary object of the present invention to provide a shock absorber with a rebound piston valve system having continuous controlled restriction of fluid flow.

It is a further object of the present invention to provide such a shock absorber which allows for damping to be determined by the restriction between the valve ring and a series of valve code plates.

It is still a further object of the present invention to provide such a shock absorber which allows for normal initial bleed on rebound followed by restriction decreasing in function based on the shape of the valve code plates.

Still another object of the present invention is to provide such a shock absorber in which the contour of the restricting valve code plate may be varied depending on the desired damping.

A further object of the present invention is to provide such a shock absorber which provides high consistency when a rebound spring of low tolerance is used.

An additional object of the present invention is to provide such a shock absorber which provides for automatic centering of the spacer bushing, the seal, and the piston rod.

Yet a further object of the present invention is to provide such a shock absorber which allows for disassembly with only the loss of connecting rivet pins.

Still a further object of the present invention is to provide such a shock absorber which is comprised of a minimum number of parts.

Yet a further object of the present invention is to provide such a shock absorber which is reliable and may be produced at a low cost.

The shock absorber of the present invention utilizes an array of fluid passages formed within the reciprocating piston. The passages are radially formed as slots in the piston and provide a restrictive gap between a contoured wall defined within the slots and the movable valve ring of the piston assembly. The damping characteristics of the shock absorber are determined by the restriction caused by the valve code plates.

The pre-load of the rebound spring provides a typical bleed curve until a certain pressure is reached over the valve. This pressure is determined by the pre-load of the rebound spring and the working area of the valve ring and the intake valve. Beyond this point of pressure, the restriction will decrease in function based on the shape of the contoured wall of the fluid-passing slot. The travel of the rebound spring is limited by its solid height, so at high rod velocities, a typical bleed curve is again achieved. Virtually any damping curve may be achieved by selection of a contoured wall having a preferred contour.

In the preferred embodiment of the present invention the contoured wall is formed as a wall of the slot in the piston.

According to an alternate embodiment, the contoured wall is defined by an interchangeable valve code plate that is a separate piece from the piston. This interchangeability feature provides a cost-effective method of producing a basic shock absorber that is easily adapted to different damping requirements by the exchange of valve code plates.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is a schematic representation of the shock absorber according to the present invention, in operative association with a typical automobile;

FIG. 2 is a plan view of a shock absorber according to the present invention;

DETAILED DESCRIPTION OF THE PREFERRED EMBODIMENT

Figure 3:
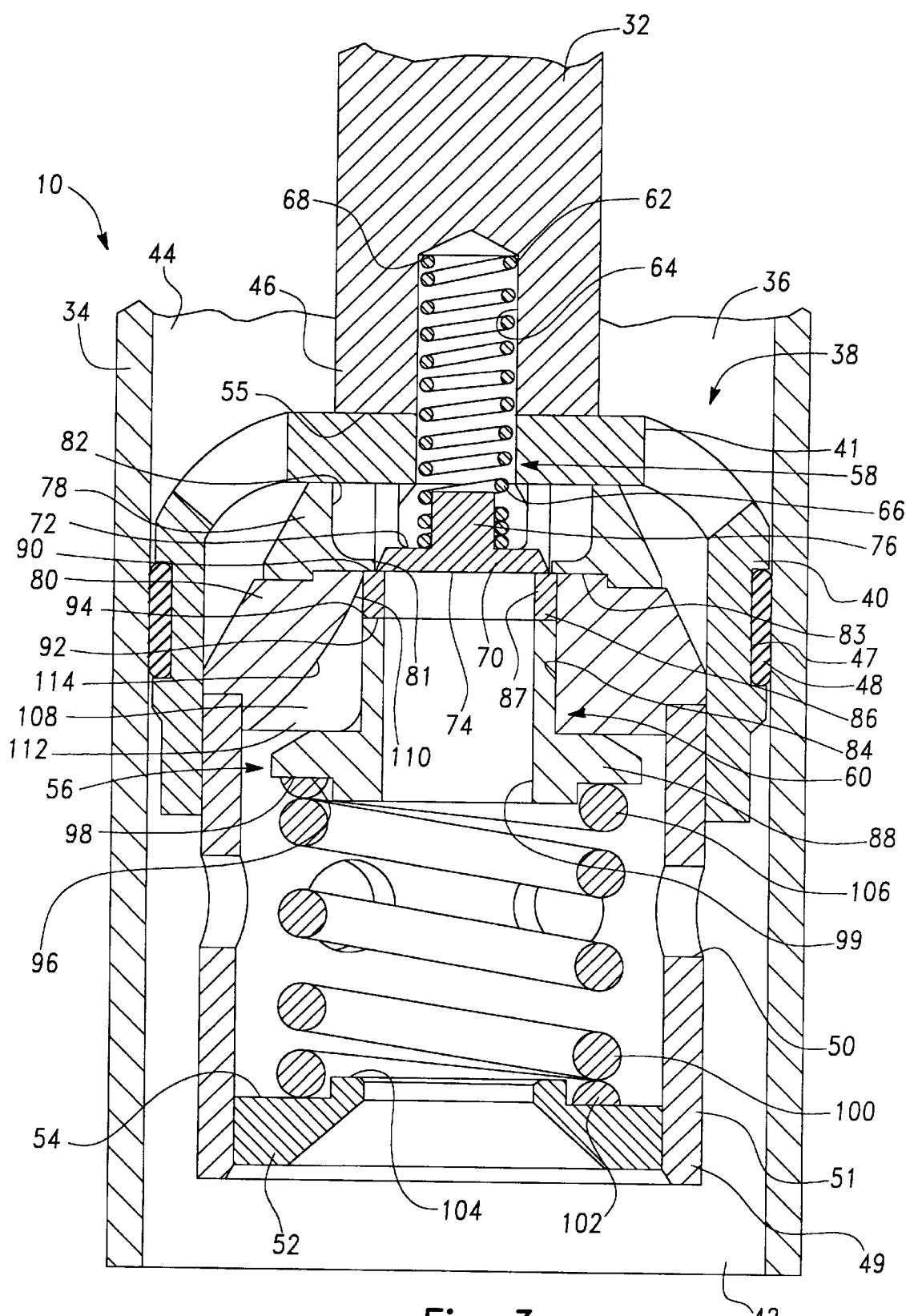
FIG. 3 is a sectional view of the piston assembly and connecting piston rod illustrated within a portion of the pressure tube housing according to a preferred embodiment of the present invention.

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Referring to FIG. 1, a plurality of four shock absorbers 10 according to a preferred embodiment of the present invention are shown. The shock absorbers 10 are depicted in operative association with a diagrammatic representation of a conventional automobile 12 having a vehicle body 14. The automobile 12 includes a rear suspension system 16 having a transversely extending rear axle assembly (not shown) adapted to operatively support the vehicle's rear wheels 18. The rear axle assembly is operatively connected to the automobile 12 by a pair of shock absorbers 10 and a pair of helical coil springs 20. Similarly, the automobile 12 has a front suspension system 22 including a transversely extending front axle assembly (not shown) to operatively support the vehicle's front wheels 24. The front axle assembly is operatively connected to the vehicle body 14 by means of a second pair of shock absorbers 10 and by another pair of helical coil springs 20. The shock absorbers 10 serve to damp the relative movement of the unsprung portion (i.e., the front and rear suspension systems 22 and 16 respectively) and the sprung portion (i.e., the body 14) of the automobile 12. While the automobile 12 has been depicted as a passenger car, the shock absorber 10 may be used with other types of vehicles or in other types of vibration damping applications. Further, the term "shock absorber" as used herein will refer to shock absorbers in the general sense of the phrase and will include MacPherson struts.

With particular reference now to FIG. 2, the shock absorber 10 according to the present invention is shown. The shock absorber 10 comprises a first tubular end 26 and a second tubular end 28, the ends 26 and 28 generally defining tubular assemblies. A suitable end fitting 30 is secured to the lower end of the first tubular end 26 for operatively securing the shock absorber 10 to the axle assembly of the automobile 12 in a conventional manner. A piston rod 32 includes a threaded end 33 that extends through the second tubular end 28 and is attached to the vehicle body 14 also in a conventional manner.

Figure 4:
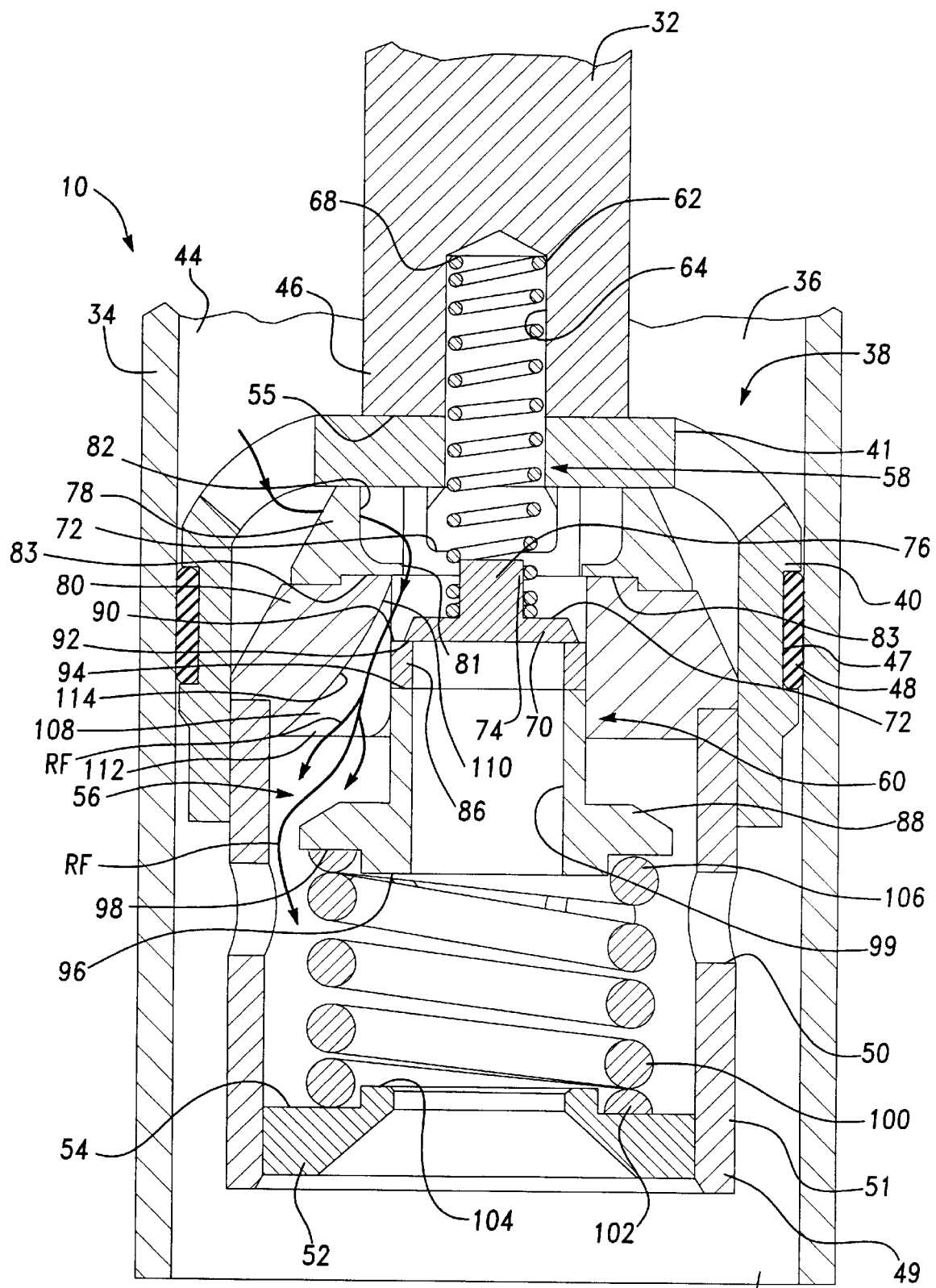
FIG. 4 is a view similar to that of FIG. 3 but showing the piston assembly moved to its rebound-fluid passing position.

With respect to FIGS. 3 and 4, sectional views of an enlarged portion of the preferred embodiment of the shock absorber 10 according to the present invention are illustrated. FIG. 3 illustrates the shock absorber 10 in its neutral position, while FIG. 4 illustrates rebound fluid flowing through the shock absorber 10. The shock absorber 10 comprises an elongated pressure tube cylinder 34 defining a damping fluid-containing working chamber 36. The elongated pressure tube cylinder 34 is generally housed within the second tubular end 28 (shown in FIG. 2) in a known manner.

A reciprocatingly movable piston assembly, generally illustrated as 38, includes a reciprocal piston 40 having a plurality of fluid passageways 41. The piston assembly 38 divides the working chamber 36 into a compression side 42 and a rebound side 44. The reciprocal piston 40 is secured to one end of an axially extending piston post 46 by known methods. The piston post 46 is in turn secured to the axially extending piston rod 32 which passes through the second tubular end 28 (shown in FIG. 2). A groove 47 is formed around the outer periphery of the piston 40. Within this groove is fitted a seal or PTFE (polytetrafluoroethylene) band 48. The PTFE band 48 permits reciprocal movement of the piston assembly 38 with respect to the cylinder 34 without generating undue frictional force.

The piston assembly 38 further includes a cup-shaped housing member 49 having a series of fluid apertures 50 formed in a peripheral wall 51. The housing member 49 includes a base 52 having an upper side 54. The housing member 49 is force-fitted into the reciprocal piston 40 or is otherwise attached by means known to those skilled in the art. Movement of the piston assembly 38 in a first direction is limited by a radially extending shoulder 55 formed on the end of the piston post 46. Movement of the piston assembly 38 in a second direction is limited by its being mated with the piston post 46.

Housed between the reciprocal piston 40 and the housing member 49 is a rebound-intake valve assembly, generally illustrated as 56. The valve assembly 56 includes an intake valve subassembly 58 and a rebound valve subassembly 60. The subassemblies 58 and 60 are generally axially aligned along the long axis of the piston assembly 38.

The intake valve subassembly 58 includes an intake spring 62 seated within a blind bore 64 formed in the end of the piston post 46. The intake spring 62 includes a first end 66 and a second end 68. The intake valve subassembly 58 further includes an intake valve 70 having a rebound side 72 and a compression side 74. A stud 76 is formed on the rebound side 72 of the intake valve 70. The first end 66 of the intake spring 62 is fitted to the stud 76, while the second end 68 of the intake spring 62 rests against the end wall of the blind bore 64.

The rebound valve subassembly 60 includes a spacer 78, a housing 80, and a fluid flow restricting member 86, 88. The spacer 78 has a centrally-formed fluid aperture 81 and a plurality of fluid flow apertures 82 formed therein that allow flow of fluid (when not restricted by a valve) between the rebound and compression sides 44 and 42 respectively. A radially-formed surface 83 is formed on the fluid flow restricting member-facing side of the spacer 78. The spacer 78 is positioned between the inner wall of the piston 40 and a housing 80.

A fluid and reciprocating valve passageway 84 is centrally formed in the housing 80. Within the passageway 84 is reciprocatingly provided the flow restricting member 86,88 comprising a reciprocating valve ring 86 (having a centrally-formed fluid passageway 87) and a reciprocating valve ring support member 88. The reciprocating valve 86 includes an upper side 90 and a lower side 92. The support member 88 includes an upper side 94 and a lower side 96 having a recessed radial wall 98. The support member 88 further includes a centrally formed fluid passageway 99.

A helical coil rebound spring 100 is arranged concentrically within the peripheral wall 51 of the housing member 49. The helical coil rebound spring 100 includes a first end 102 that seats on the upper side 54 of the base 52 around a raised centering ring 104 formed on the upper side 54. The helical coil rebound spring 100 also includes a second end 106 which bears against the recessed radial wall 98 formed on the lower side 96 of the support member 88.

The housing 80 includes a series of radially formed restrictive rebound fluid flow passages 108, of which only one is shown in FIGS. 3 and 4. Preferably there would be a plurality of the passages 108 evenly spaced about the central axis of the assembly 38. A preferred number of such passages 108 is three, although a greater or lesser number might as well be employed. Regardless of the number, each of the passages 108 includes a rebound fluid entrance area 110, a rebound fluid exit area 112, and a contoured passage wall 114. As illustrated, the width of the entrance area 110 is narrower than the width of the exit area 112, and it is these relative widths and the contour of the contoured passage wall 114 that determines damping characteristics of the particular shock absorber. Accordingly, the ratio of the widths of the entrance area 110 and the exit area 112 as well as the contour of the contoured passage wall 114 may be varied depending on the particular application for the shock absorber 10. The wider the exit area 112, the greater the flow-through of rebound fluid, and the less the restriction thereof. Relatedly, the contour of the contoured passage wall 114 also affects flow by, for example, creating or minimizing turbulence in the passing fluid.

FIG. 3 illustrates both the intake valve subassembly 58 and the rebound valve subassembly 60 in their closed positions with no fluid passing therethrough. With respect to the intake valve subassembly 58, the compression side 74 of the intake valve 70 is seated against the upper side 90 of the reciprocating valve 86. On compression, fluid passes into the fluid passageway 99 of the member 88 and the fluid passageway 87 until it reaches sufficient pressure to overcome the resistance of the intake spring 62. At this point, the intake valve 70 is pushed into its open position (not shown), and fluid is allowed to pass.

With respect to the rebound valve subassembly 60, the helical coil rebound spring 100 acts biasingly against the valve ring 86 through the member 88 to urge the ring 86 into its closed position against the radially-formed surface 83 of the spacer 78.

With respect to FIG. 4, the rebound valve subassembly 60 is illustrated in an open position, wherein the rebound fluid has built to sufficient pressure on the rebound side 44 of the intake valve 70 so as to overcome the resistance of the rebound spring 100. At this point, the valve ring 86 is separated from the surface 83, and fluid is allowed to pass into the fluid flow passages 108, as illustrated by the arrow "RF". The amount of fluid flow which is allowed to flow into fluid flow passage 108 will progressively increase with the downward movement of valve ring 86 due to contoured surface 114.

FIGS. 5 through 8 illustrate an alternate embodiment of the present invention. With respect to FIG. 5, a sectional view of the piston within the piston housing of a shock absorber 10' is shown. The shock absorber 10α comprises an axially extending piston rod 32' and an elongated pressure tube cylinder 34' that defines a damping fluid-containing working chamber 36'. The elongated pressure tube cylinder 34' is generally housed within the second tubular end 28 (shown in FIG. 2) in a known manner. The flow of rebound fluid is illustrated as the arrow "RF".

A reciprocatingly movable piston assembly, generally illustrated as 138, includes a reciprocal piston 140. The piston 140 divides the working chamber 36' into a compression side 42 and a rebound side 44'. The reciprocal piston assembly 138 is secured to one end of an axially extending piston post 146 by a nut 148. The piston post 146 is in turn secured to the axially extending piston rod 32' which passes through the second tubular end 28.

The piston assembly 138 further includes a spacer bushing 152 and a spring seat 154. Within the piston 140 are radially positioned a plurality of interchangeable valve code plates 155, the form and function of which will be detailed below. A plurality of fluid-passing apertures 156 are formed through the spring seat 154.

The piston 140, the spacer bushing 152, and the spring seat 154 are connected by a plurality of rivet pins 157. Each of the pins 157 passes through an aperture 158 formed in the nut 148, an aperture 160 formed in the piston 140, and an aperture 162 formed in the spring seat 154. Other methods of fastening the elements of the piston assembly 138 are possible and are known to those skilled in the art.

The outer diameter of the piston 140 and the outer diameter of the spring seat 154 are substantially identical, while the outer diameter of the spacer bushing 152 is smaller, forming a space between the outer periphery of the spacer bushing and the inner peripheral wall of the cylinder 34'. Within this space is fitted a seal or PTFE (polytetrafluoroethylene) band 164. The PTFE band 164 permits reciprocal movement of the piston assembly 138 with respect to the cylinder 34' without generating undue frictional forces.

Movement of the piston assembly 138 in a first direction is limited by a radially extending shoulder 166 formed on the end of the piston post 146. Movement of the piston assembly 138 in a second direction is limited by the nut 148 (or similar type of fastening element) which is matably (i.e., threadably or forcefittably) received on the piston post 146.

Figure 5:
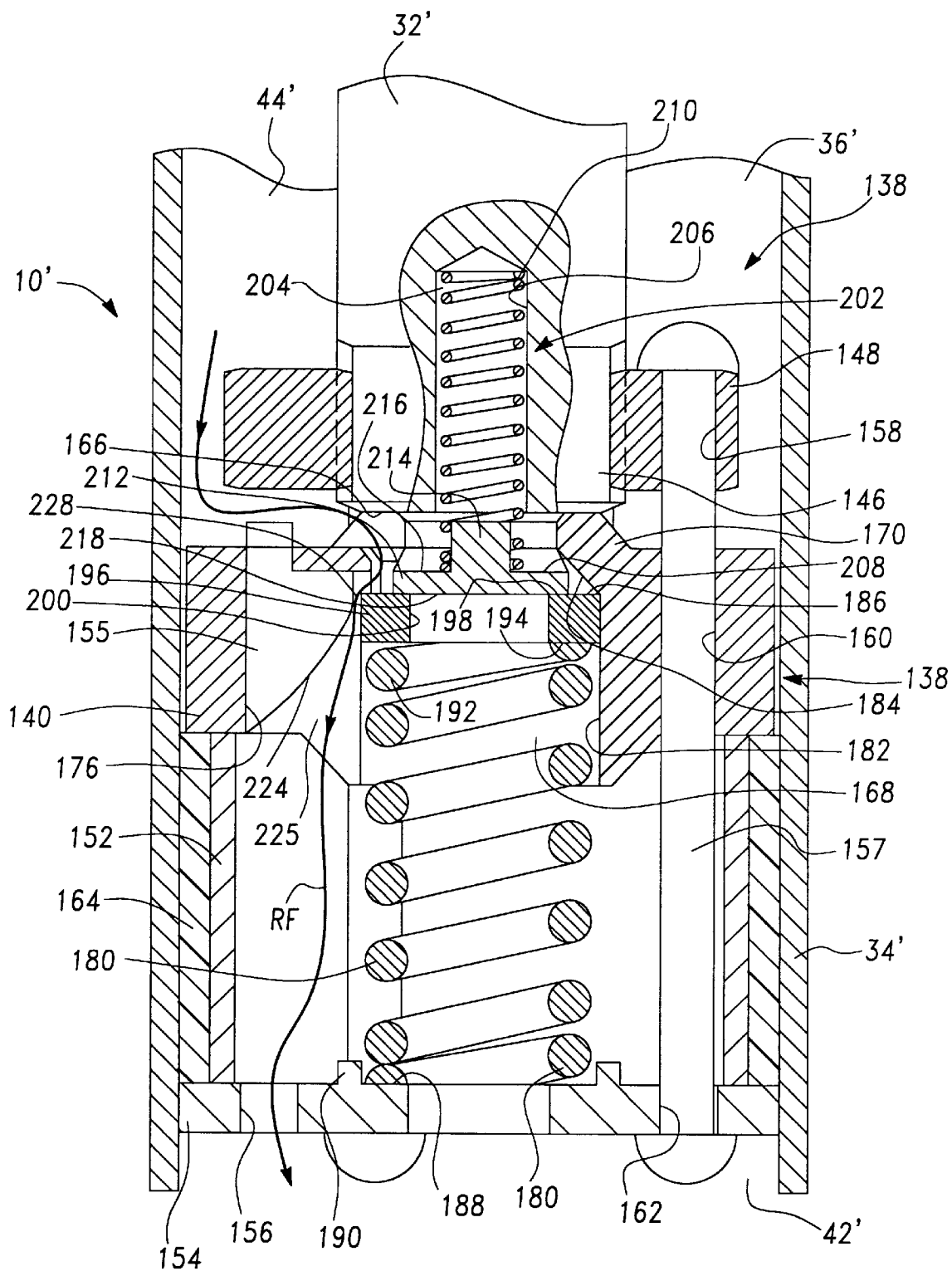
FIG. 5 is a sectional view of an alternate embodiment of the piston and the connecting piston rod illustrated within a portion of the pressure tube housing.
Figure 6:
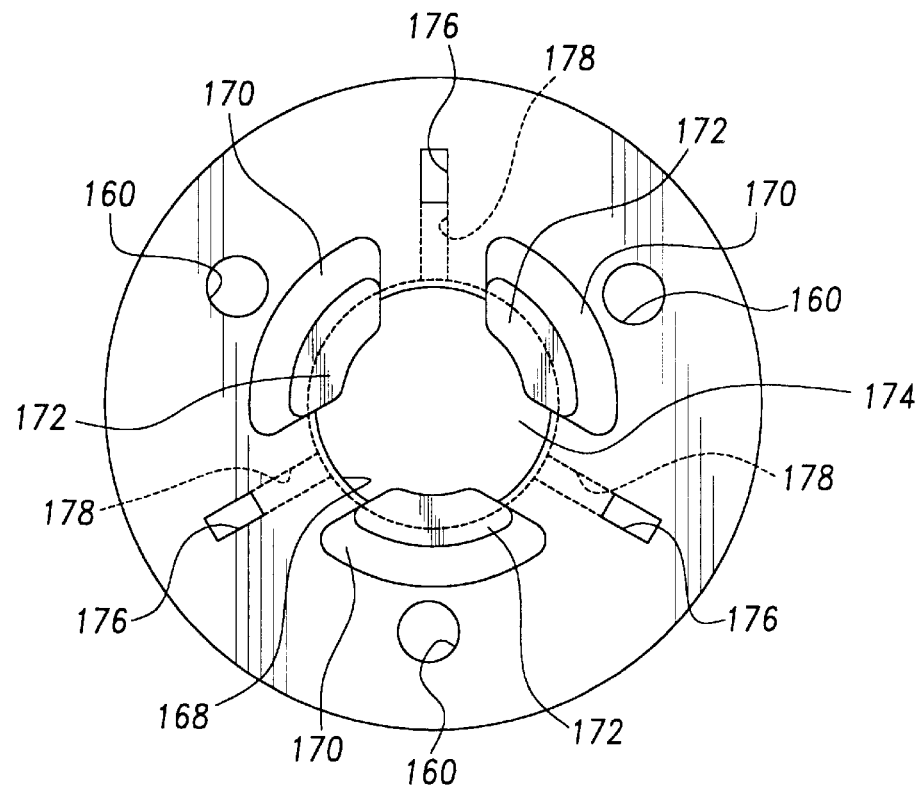
FIG. 6 is a plan view of the rebound side of the shock absorber piston according to the embodiment of FIG. 5.

FIG. 6 illustrates a plan view of the rebound side of the piston 140. The rivet pin-passing apertures 160 are clearly illustrated. A central fluid-passing aperture 168 is centrally formed through the piston 140. A series of spaced-apart, radially disposed shoulders 170 are formed on the surface of the rebound side of the piston 140. Each of the shoulders 170 includes a contact surface 172 that abuts the radially extending shoulder 166 formed on the end of the piston post 146. This relationship is clearly shown in FIG. 5.

Still with respect to FIG. 6, a fluid-passing space 174 is formed between adjacent ones of the shoulders 170. On rebound, fluid is selectively allowed to pass first through the spaces 174 and then through the central fluid-passing aperture 168, as will be detailed below.

Between each pair of adjacent rivet pin apertures 160 is formed a valve code plate aperture 176 which is continuous with a valve code plate slot 178 (the latter being shown in broken lines). The tab of the valve code plate 155 (described below with respect to FIGS. 7 and 8) is slotted into the valve code plate aperture 176, while the body of the valve code plate 155 is fitted within the valve code plate slot 178.

Referring back to FIG. 5, a helical coil rebound spring 180 is arranged concentrically within a counterbore 182 centrally formed within the piston 140. A chamfered shoulder 184 is formed adjacent the counterbore 182. The chamfered shoulder 184 and the counterbore 182 join to form a valve ring seat 186. The chamfered shoulder 184 and the counterbore 182 form a semi-continuous inner wall, the continuity of which is broken by the valve code plate slots 178.

The helical coil rebound spring 180 includes a first end 188 that seats within a cup 190 formed on the rebound side of the spring seat 154. The helical coil rebound spring 180 also includes a second end 192 which bears against a compression side 194 of a valve ring 196. The valve ring 196 also includes a rebound side 198. The valve ring 196 is movably seated within the counterbore 182 against the valve ring seat 186. The helical coil rebound spring 180 acts biasingly against the valve ring 196 to urge the ring 196 into position on the valve ring seat 186. The valve ring 196 includes a centrally-formed fluid-passing aperture 200 that is continuous between the compression side 194 and the rebound side 198.

Positioned between the piston assembly 138 and the piston post 146 is an intake valve assembly, generally illustrated as 202. The intake valve assembly 202 includes an intake spring 204 seated within a blind bore 206 formed in the end of the piston post 146. The intake spring 204 includes a first end 208 and a second end 210. The intake valve assembly further includes an intake valve 212 that is reciprocatingly positioned within the throughbore formed in the piston 140. A stud 214 is formed on the rebound side 216 of the intake valve 212. The intake valve also includes a compression side 218. The first end 208 of the intake spring 204 is fitted to the stud 214, while the second end 210 of the intake spring 204 rests against the end wall of the blind bore 206.

The intake valve 212 is illustrated in FIG. 5 in its closed position. As shown, the compression side 218 of the intake valve 212 is seated against the rebound side 198 of the valve ring 196 in a fluid-stopping manner. The compression side 218 of the intake valve 212 is forced away from and is therefor spaced apart from the rebound side 198 of the valve ring 196 on the compression stroke, as will be described below.

Figure 7:
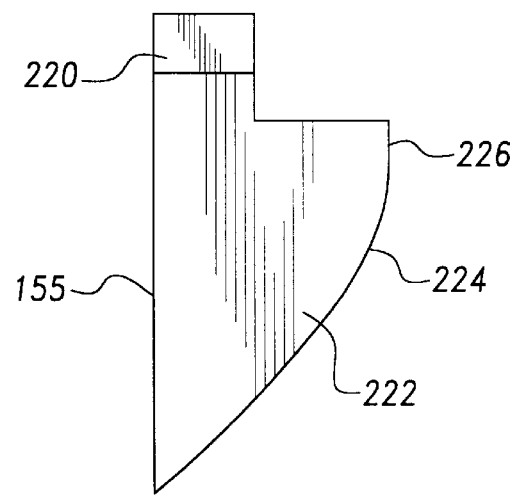
FIG. 7 is a side view of a valve code plate having a preferred contour for use with the piston assembly of the embodiment of FIG. 5.
Figure 8:
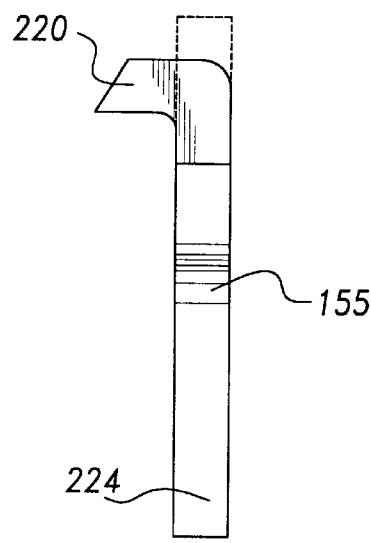
FIG. 8 is an end view of the valve code plate of FIG. 7.
Figure 9:
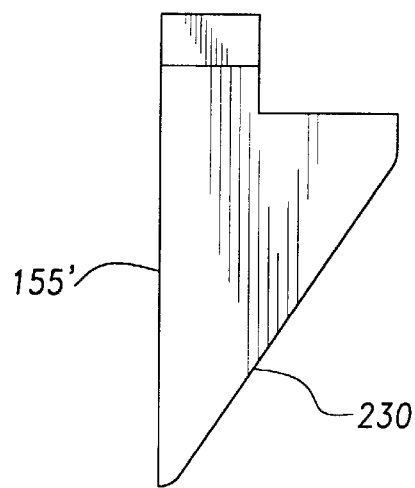
FIG. 9 is a side view of an alternate embodiment of a code plate for use with the piston assembly of the embodiment of FIG. 5.

Referring to FIGS. 5, 6, 7, 8, and 9 the valve code plate 155 (or 155' of FIG. 9) includes a tab 220 and a body 222. The valve code plate 155 is preferably stamped out of stock that is 1 mm thick, although it is conceivable that other thicknesses could be used. On assembly of the valve code plate 155 to the piston 140, the tab 220 is inserted into the valve code plate aperture 176 and is thereafter bent over (as illustrated in FIG. 8) from its flat configuration (also as illustrated in FIG. 8). The bent over tab 220 prevents the valve code plate 155 from slipping out of the valve code plate slot 178.

The valve code plate 155 includes a contoured passage wall 224 formed as one of the terminal edges of the body 222. The passage wall 224 forms a wall of a restrictive rebound fluid flow passage 225 having an entrance width narrower than its exit width, as with the passage 108 described above with respect to FIGS. 3 and 4. As illustrated best in FIG. 7, the contoured passage wall 224 defines a gently sloping curve. The illustrated shape is one of an almost infinite number of shapes that could be used, and other shapes such as straight or concave, could as well be used. The selected shape is dictated by the desired damping effect. The valve code plate 155 also includes a flat wall 226. A restrictive gap 228 is defined between the flat wall 226 and the peripheral wall of the valve ring 196, as shown in FIG. 5.

On compression, the piston 140 is moved within the cylinder 34' and compresses fluid located in compression side 42'. This action forces the fluid to flow through the apertures 156 formed in the spring seat 154 and through the aperture 200 formed in the ring valve 196. The pressure of the fluid acts against the compression side 218 of the intake valve 214 until the pressure overcomes the resistance of the intake spring 204, at which point the intake valve 214 opens and fluid is allowed to pass.

On rebound, the piston 140 is moved within the cylinder 34' in the opposite direction and compresses fluid located in rebound side 44'. This action forces the fluid to flow through the fluid-passing spaces 174, into the aperture 168, and through the valve code plate slot 178 between the flat wall 226 and the valve ring 196. The size of the gap 228 as well as the space remaining within the valve code plate slot 178 that is not filled by the valve code plate 155 (illustrated in FIG. 5) determines the restriction of the passing fluid. When the rebounding fluid reaches a higher point of pressure, the resistive force of the rebound spring 180 is overcome, and the valve ring 196 opens, allowing for increased flow of the fluid thereby. Alternatively, a code plate such as code plate 155' shown in FIG. 9 may be used having a substantially flat contoured wall 230.

Figure 10:
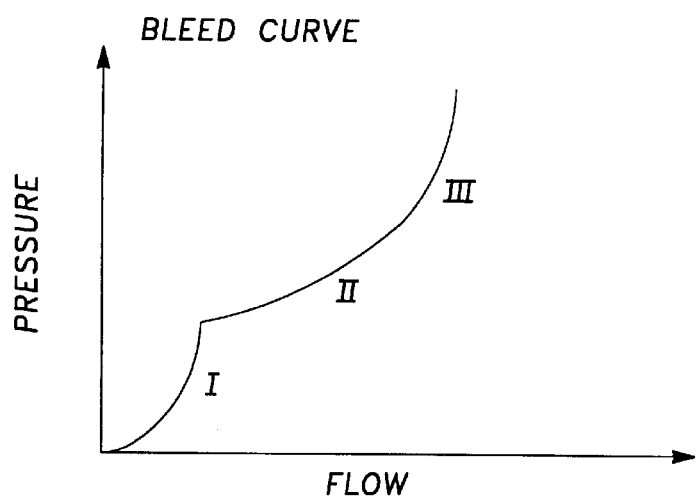
FIG. 10 is a graph illustrating the bleed curve produced by the shock absorber of the present invention.

FIG. 10 is a graph illustrating a bleed curve for the shock absorber according to the present invention utilizing the contoured walls of FIGS. 3 and 4 and the valve code plates of the contours shown in FIGS. 7 and 8. It is to be understood that the shown curve is only illustrative, and that other curves are possible depending on the contour of the selected valve code plate. PRESSURE is read along the Y-axis and FLOW is read along the X-axis.

Because of the pre-load of the rebound spring, a typical bleed curve is initially formed, as shown by the segment of the curve identified as "I". At a certain predetermined pressure over the valve ring (this pressure being determined by the preload of the rebound spring and the working area of the valve ring and the intake valve), the restriction will decrease as a function of the contour of the contoured restrictive wall. This decrease in restriction is demonstrated by the segment of the curve identified as "II". The travel of the rebound spring is limited by its solid height, so at high rod velocities, a typical bleed curve again returns, as demonstrated by the segment of the curve identified as "III".

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A shock absorber comprising:
   a pressure tube symmetrically disposed about an axis, said pressure tube forming a working;
   a piston assembly slidably disposed within said working chamber, said piston separating said working chamber into an upper and a lower portion;
   a fluid flow restricting member disposed within said piston assembly;
   a rebound fluid flow passage formed in said piston assembly, said passage including a fluid entrance, a fluid exit and a contoured wall extending between said fluid entrance and said fluid exit, said passage having a cross-sectional area which continuously increases from said fluid entrance to said fluid exit, said fluid flow restricting member being movable with respect to said contoured wall between said fluid entrance and said fluid exit to progressively increase said cross-sectional area of said passage.

2. The shock absorber according to claim 1, wherein said contoured wall is angularly positioned with respect to said fluid flow restricting member.

3. The shock absorber according to claim 2, wherein said contoured wall is substantially flat.

4. The shock absorber according to claim 1, further including a reciprocating rebound valve centrally positioned within said shock absorber, said rebound valve including said fluid flow restricting member.

5. The shock absorber according to claim 1, wherein said fluid flow restricting member includes a valve ring and a reciprocating valve support member.

6. The shock absorber of claim 1, wherein said rebound fluid flow passage is defined by a valve code plate positioned within a slot formed in said piston, at least a portion of said valve code plate forming said contoured wall.

7. The shock absorber of claim 6, wherein said valve code plate is formed from a substantially flat material.

8. The shock absorber of claim 1, wherein said contoured wall is defined by a non-linear surface.

9. The shock absorber of claim 1, further including an elongated piston rod having first and second ends, said first end being attached to said piston assembly, said second end of said elongated piston rod extending along the axis of said pressure tube through said upper portion of said working chamber and out one end of said pressure tube.

10. A shock absorber comprising:
    a pressure tube forming a working chamber;
    a piston assembly slidably disposed within said fluid chamber, said piston separating said working chamber into an upper and a lower portion, said piston assembly allowing restricted flow of hydraulic fluid between said upper and lower portions of said working chamber;
    a rebound valve assembly operatively associated with said piston assembly, said rebound valve assembly including a fluid flow restricting member and a rebound fluid flow passage having a rebound fluid entrance, a rebound fluid exit and a wall extending between said fluid entrance and said fluid exit, said wall being formed to provide said passage with a cross-sectional area which continuously increased from said fluid entrance to said fluid exit, said fluid flow restriction member being movable with respect to said wall between said fluid entrance and said fluid exit to progressively increase said cross-sectional area of said passage.

11. The shock absorber of claim 10, wherein said fluid flow restricting member further includes a fluid restricting surface, said fluid restricting surface defining a portion of said fluid flow passage.

12. The shock absorber of claim 11, wherein said wall is angularly positioned with respect to said fluid restricting surface.

13. The shock absorber of claim 10, wherein said wall is substantially non-linear.

14. A rebound valve assembly for use in a shock absorber having a reciprocating piston assembly and a piston rod, said shock absorber including:
    a fluid flow restricting member;
    a rebound fluid flow passage, the reciprocating piston assembly having a central axis, said passage being formed radially with respect to said central axis of the reciprocating piston, said passage including a rebound fluid entrance, a rebound fluid exit and a wall extending between said fluid entrance and said fluid exit, said wall being angularly formed to provide said passage with a cross-sectional area which continuously increased from said fluid entrance to said fluid exit, said fluid flow restriction member being movable with respect to said wall between said fluid entrance and said fluid exit to progressively increase said cross-sectional area of said passage.

15. The rebound valve assembly of claim 14, wherein said rebound fluid entrance is narrower than said rebound fluid exit.

16. The rebound valve assembly of claim 15, wherein said wall is substantially flat.

17. The rebound valve assembly of claim 15, wherein said wall is substantially non-linear.

18. The rebound valve assembly of claim 14, further including a member having a centrally formed, fluid-passing aperture, said passage being formed in said member.

19. The rebound valve assembly of claim 18, further including a reciprocating rebound valve fitted within said centrally formed, fluid-passing aperture.

20. The rebound valve assembly of claim 19, wherein said reciprocating rebound valve includes said fluid flow restricting member.

21. The rebound valve assembly of claim 20, wherein said reciprocating rebound valve is movable between an open, fluid-passing position and a closed, fluid-blocking position, at least a portion of said reciprocating rebound valve substantially contacting said rebound fluid entrance when said reciprocating rebound valve is in said closed, fluid-blocking position.

* * * * *

UNITED STATES PATENT AND TRADEMARK OFFICE
CERTIFICATE OF CORRECTION

PATENT NO. : 5,769,190

DATED : June 23, 1998

INVENTOR(S) : Stefan Deferme

It is certified that error appears in the above-identified patent and that said Letters Patent is hereby corrected as shown below:

Title Page, [57] Abstract, line 5, "form" should be --forms--

Col. 5, line 21, "a reciprocating valve ring 86" should be --the fluid flow restricting member 86--;

Col. 5, line 23, "reciprocating valve 86" should be --fluid flow restricting member 86--

Col. 5, line 64, "reciprocating valve 86" should be --fluid flow restricting member 86--

Col. 6, line 5, "valve ring 86" should be --fluid flow restricting member 86--

Col. 6, line 5, "ring 86" should be --member 86--

Col. 6, line 12, "valve ring 86" should be --fluid flow restricting member 86--

Col. 6, line 21, "absorber 10a" should be --absorber 10'--

Col. 6, line 31, "side 42" should be --side 42'--

Col. 7, line 65, "or 155' of" should be --element 155' in--

Col. 8, line 17, "such" should be --(such--

Col. 8, line 17, "concave," should be --concave),--

UNITED STATES PATENT AND TRADEMARK OFFICE
CERTIFICATE OF CORRECTION

PATENT NO. : 5,769,190
DATED : June 23, 1998
INVENTOR(S) : Stefan Deferme

It is certified that error appears in the above-identified patent and that said Letters Patent is hereby corrected as shown below:

Col. 9, line 12, claim 1, after "working" insert --chamber--

Col. 9, line 15, claim 1, after "upper" insert --portion--

Col. 9, line 59, claim 10, after "upper" insert --portion--

Col. 10, line 6, claim 10, "increased" should be --increases--

Col. 10, line 23, claim 14, "said" should be --the--

Col. 10, line 33, claim 14, "increased" should be --increases--

Signed and Sealed this

Twentieth Day of April, 1999

Attest:

Q. TODD DICKINSON

Attesting Officer

Acting Commissioner of Patents and Trademarks